United States Patent [19]

Zimmermann

[11] Patent Number: 4,540,738
[45] Date of Patent: Sep. 10, 1985

[54] ACRYLIC ADHESIVE COMPOSITION COMPRISING AN ALPHA AMINO PHOSPHONIC ACID OR SALT HAVING IMPROVED STABILITY

[75] Inventor: William D. Zimmermann, Farmington Hills, Mich.

[73] Assignee: The Kendall Company, Boston, Mass.

[21] Appl. No.: 679,159

[22] Filed: Dec. 7, 1984

[51] Int. Cl.$^3$ ............................ C08K 5/53; C08K 5/51
[52] U.S. Cl. ...................................... 524/707; 523/176; 524/121; 524/124; 524/708; 524/721; 526/193
[58] Field of Search ................ 526/193; 523/176; 524/124, 121, 707, 708, 721

[56] References Cited

U.S. PATENT DOCUMENTS

| | | | |
|---|---|---|---|
| 4,038,475 | 7/1977 | Fravenglas | 523/176 |
| 4,082,713 | 4/1978 | Kelley | 524/124 |
| 4,215,209 | 7/1980 | Ray-Chaudhuri | 523/176 |
| 4,247,435 | 1/1981 | Kasten | 523/179 |
| 4,290,930 | 9/1981 | Nolken | 524/707 |
| 4,316,000 | 2/1982 | Boeder | 523/176 |

*Primary Examiner*—Herbert J. Lilling
*Attorney, Agent, or Firm*—Edward J. Scahill, Jr.

[57] ABSTRACT

The present invention comprises an acrylic adhesive composition having improved stability comprising polymerizable acrylic monomers in combination with polymerization initiators therefor; the improvement further comprises incorporating in the homogenous mixture of acrylic monomers and an initiator, including other substances to augment its performance as an adhesive, an effective amount of an inhibitor, being hydroquinone, and an effective amount of accelerator, being alpha amino phosphonic acid, or an alkali metal salt thereof.

6 Claims, No Drawings

ACRYLIC ADHESIVE COMPOSITION COMPRISING AN ALPHA AMINO PHOSPHONIC ACID OR SALT HAVING IMPROVED STABILITY

BACKGROUND OF THE INVENTION

The present invention relates to improved acrylic adhesive compositions.

The present invention further relates to acrylic adhesive compositions containing free radical initiators, having improved stability.

The present invention also relates to two component acrylic adhesive systems, i.e., a system in which the initiator and accelerator are kept separately prior to use.

All polymerizable adhesives have a limited shelf life. When stored at room temperature, the polymerizable adhesives ultimately undergo polymerization. However, premature gelation, a highly undesirable feature, can occur if the adhesive is not suitably stabilized. In some cases, the effect on components of an adhesive upon aging will result in a reduction of the rate at which the adhesive can cure when the accelerator is added.

In general, the tendency of an adhesive, or polymerizable monomer system to gel or polymerize, increases as the temperature increases. Conversely, lower temperature storage of the adhesive material results in an extension of the shelf life. In fact, in many segments of the adhesive market, refrigeration of adhesive products is often required. However, this technique to increase adhesive shelf life is both cumbersome and expensive. Moreover the adhesives must be rewarmed to working temperatures, usually room temperature, after refrigeration in order to attain a reasonable rate of cure or fixture time.

In the prior art, approaches are disclosed which utilize the addition of various substances in order to stabilize polymerizable adhesives, but many of these additives adversely affect the speed of cure of the adhesive, or they result in a deleterious lowering of the adhesive strength.

An ideal stabilization system is one which incorporates additives which have no adverse effect on cure speed or the adhesive physical properties, while imparting to the adhesive the desired shelf life. Much of the technology related to stabilization of acrylic adhesives has been developed for the "anaerobic" adhesives, where contamination of the composition by various metal ions has a negative effect on storage stability. In particular, transition metals having two or more valences are considered deleterious, and it is believed that such transition metals function as reductants by reacting with a free radical initiator, in particular, hydroperoxides, in a redox system.

Inhibitors previously utilized for free radical polymerizations include: quinones, hydroquinones, catechols, sterically-hindered phenols, phenothiazines, aminophenols, inorganic salts or oxides, quinone-oximes, nitroso-amines, etc. Of these, the most commonly used to stabilize commercial monomers are the quinones, hydroquinones and hydroquinone alkyl ethers. These inhibitors are effective barriers to polymerization of stored monomers. However, for the monomers containing peroxidic materials, such as typical free radical initiators, not only are the phenolic or amine inhibitors required, but also materials to remove or inactivate substances that may cause premature polymerization. In particular, transition metals or their ions are known to decompose hydroperoxides to produce radical products, which, in turn, initiate polymerization.

In the case of acrylic adhesives, or acrylic monomer compositions that cure and hold substrates together, the curing or hardening reaction is a polymerization of the monomers or oligomers. Premature formation of free radicals, by a redox reaction involving the peroxide or hydroperoxide, must be avoided if the adhesive is to have an adequate shelf storage life.

Thus, in addition to the typical free radical inhibitor, as described above, the incorporation of a second substance to inactivate contaminating transitional metal ions is often required for adequate storage stability of compositions containing acrylic monomers and/or oligomers, and a peroxidic polymerization initiator, such as a hydroperoxide.

U.S. Pat. No. 3,971,765 discloses that alpha aminocarboxylic monomers of the ethylenediamine tetraacetic acid (EDTA) type can be used to improve the stability of anaerobic adhesive formulations. Anaerobic adhesives are adhesives that are designed to cure or polymerize in the absence of oxygen.

As pointed out earlier, it is believed that trace metal ion contamination adversely affects the shelf life of the adhesive or at least renders the performance of the adhesive unreliable. The EDTA presumably chelates the metal ions, thereby rendering them ineffective in terms of reacting with the peroxidic initiator. The concentration levels taught in the '765 patent makes this technology undesirable. The '765 patent also points out the possibility of future contamination, i.e., if the chelator/sequestrant is insoluble in the adhesive mixture and separates from the mixture it cannot tie up newly introduced metal ions.

U.S. Pat. No. 3,991,261, assigned to Henkel and Cie, discloses the use of N-alkyl-c-aryl nitrones as stabilizers for anaerobic adhesives. These compounds are claimed to enhance adhesive stability while not interfering with normal anaerobic cure chemistry.

U.S. Pat. No. 3,962,372, assigned to DuPont, states that Hypalon TM (Dupont Chemical Company)-based two-part adhesives, e.g., see U.S. Pat. No. 3,890,407, are relatively unstable and set up or cure prematurely. Many adhesive stabilizers known to the art were found to adversely affect the rate of polymerization or cure time. An exception to this class is butylated hydroxy toluene (BHT). Quinone compounds were found to be ineffective stabilizers. In each case the preferred peroxide was cumene hydroperoxide (CHP).

U.S. Pat. No. 4,034,145, assigned to Henkel and Cie, discloses the use of a percarboxylic acid in order to improve the storage stability of the anaerobic adhesive without adversely affecting the curing properties.

U.S. Pat. No. 4,262,106, assigned to Loctite, discloses a process for treating anaerobic adhesive mixtures containing a sulfimide, such as saccharin, with an insoluble chelating agent, in order to improve the stability of anaerobic compositions. The technology in the '106 patent taught is both expensive, as large amounts of chelating agent are required, and cumbersome, as a separate step to remove the excess agent is required.

U.S. Pat. No. 4,038,475, assigned to Loctite, deals with the use of soluble chelators in conjunction with a quinone type inhibitor, such as naphthoquinone, in a formulated anaerobic composition. The soluble chelators claimed are derivatives of alpha and beta-amino carobxylates, but chelators containing a —C═N— linkage are excluded since they interfere with the speed of cure. The '475 patent also teaches that some quinone-type inhibitors adversely affect the speed of cure of adhesive compositions.

Another U.S. patent, i.e., U.S. Pat. No. 4,103,081, also assigned to Loctite, discloses the use of nitrobenzene and chlorinated nitrobenzenes as stabilizers for anaerobic compositions.

SUMMARY OF THE INVENTION

An object of the present invention is to provide an improved acrylic adhesive composition.

An object of the present invention is to provide an acrylic adhesive composition containing free radical initiators, having improved stability.

A further object of the present invention is to provide an improved two-component acrylic system, i.e., an adhesive system in which the initiator is kept separate from the monomers and other additives until just prior to its use.

An object of the present invention is to provide an improved stabilization system for polymerizable acrylic adhesive mixtures containing free radical initiators.

Another object of the present invention is to provide an improved stabilizer system for acrylic adhesives.

The above and related objectives are achieved in the present invention comprising an acrylic adhesive composition having improved stability. The improvement comprises incorporating in the homogenous mixture of monomers and initiator, including other substances to augment its performance as an adhesive, an effective amount of hydroquinone, and an effective amount of an alpha amino phosphonic acid or alkali metal salt thereof.

DESCRIPTION OF THE PREFERRED EMBODIMENTS

The acrylate monomers constitute an essential ingredient of the adhesive, in that their polymerization converts the liquid adhesive to a solid. The major components of the acrylate monomer portion of the adhesive are esters of acrylic and methacrylic acids, with preference for the esters of methacrylic acid. These esters may be derived from monofunctional or polyfunctional alcohols, the latter giving rise to and providing for crosslinking. A large number of monomers, both mono-functional and polyfunctional, are available commercially and well known to those skilled in the art. A choice from this broad category of monomers is dependent upon end use application requirements, substrates to be bonded, viscosity required, and similar requirements.

Typical monofunctional monomers include, methyl methacrylate, hydroxyethyl methacrylate, tetrahydrofurfuryl methacrylate, trimethyl cyclohexyl methacrylate, cyclohexyl methacrylate, methacrylic acid, isobornyl methacrylate, ethoxyethyl methacrylate, dicyclopentenyloxyethyl methacrylate, and non-acrylates such as N-vinyl pyrrolidone and vinyl acetate. Typical polyfunctional monomers include, methacrylate esters of polyethylene glycols, such as the esters of triethylene glycol, 1,6-hexane diol, propylene glycol, 1,3- and 1,4-butylene glycol, and 1,12-dodecanediol.

Other preferred monomers include the acrylate and methacrylate esters of oligomers prepared by reacting epoxy- or isocyanate-terminated with hydroxyl-containing monomers. Particularly preferred are methacrylates obtained by reacting hydroxyethyl- or hydroxypropyl methacrylate with urethane prepolymers obtained by reaction of an excess of diisocyanate with a polyester or polyether glycol. Particularly preferred are methacrylate oligomers having a molecular weight from about 400 to about 4000.

Urethane-acrylates/methacrylates suitable as monomers in compositions for adhesives according to the present invention are described in U.S. Pat. No. 3,425,988 and U.S. Pat. No. 4,018,851, the disclosures of these patents being incorporated herein by reference.

Similarly, a number of elastomers, can be employed depending upon end use applications, process viscosity, and other end use considerations. The level of such an additive, relative to the amount of monomer, also effects performance and properties of the adhesive, and will vary from about 5 percent to about 60 percent by weight of the total reactive mixture, although a range of from about 15 percent to about 30 percent by weight of the total reactive mixture is preferred for most commercial adhesives.

Typical elastomeric agents include: natural and synthetic rubbers, such as chlorosulfonated polyethylenes, butadiene-acrylonitrile copolymers, triblock copolymers, such as Shell's Kraton ™ (Shell Oil Company) series, linear thermoplastic polyurethanes, and ethylene-acrylate copolymers series, i.e., VAMAC ™ series, as well as oligomers, which are vinyl-terminated compounds derived from epoxy resins or diisocyanates reacted with hydroxyl-terminated low molecular weight entities. The oligomers are preferably terminated with methacryloyl or acryloyl groups. In a typical synthesis, the precursor molecule, containing epoxy or isocyanate terminal groups, is reacted with an hydroxyalkyl methacrylate. Again, the particular additive selected, and the concentration level that it is used in the formulation, depends on many factors such as the viscosity required during dispensing and the properties desired after curing.

To promote polymerization of the acrylate-methacrylate materials, a free radical initiator is incorporated in an amount sufficient to initiate polymerization or cure of the adhesive composition. Preferred free-radical initiators are those with high temperature ten hour half lives; these include the hydroperoxides of the formula ROOH, wherein R is a hydrocarbon radical containing up to 18 carbon atoms. Typical examples of such initiators are cumene hydroperoxide, t-butyl hydroperoxide, 2,5-dimethyl bexane peroxide and the like. Cumene hydroperoxide is an especially preferred free-radical initiator. Additionally, blends of hydroperoxides with peresters, such as t-butyl perbenzoate, or t-butyl peroxymaleate can be advantageously employed. The level of the initiator used in the present invention may vary from about 1 to about 10 percent by weight, with levels of from about 2 to about 4 percent by weight being preferred.

For two part acrylic adhesives, the cure or polymerization is effected by contacting the monomer solution containing a free radical initiator with an activator. The activator, which can be mixed with the adhesive composition just prior to use, or can be applied to one surface to be mated with a second surface, which is coated with adhesive to affect an adhesive joint.

Suitable activators include aldehyde-amine condensates, such as VANA X 808 ™, sold by the R. T. Vanderbilt Company, or tertiary amines, such as dimethylaniline, or transition metal salts or acetylacetonates, or thioureas such as tetramethyl thioureas or acetyl thiourea.

To achieve stability of the adhesive compositon, that is, to avoid premature gelation during storage, various inhibitors and stabilizers or chelators may be added, as discussed earlier. In the practice of this invention the preferred stabilizing system consists of a mixture of hydroquinone and an alpha amino phosphonic acid, or sodium salt thereof.

The amount of hydroquinone found to be effective, is from about 300 to about 1000 parts per million (0.03 to 0.10 percent by weight) of the acrylic composition. Additionally, from about 300 to about 1000 parts per million (0.03 to 0.10 percent by weight) of alpha amino phosphonic acid, or an alkali metal salt thereof, is incorporated in the acrylic composition. The preferred alpha amino phosphonate is nitrilo (trismethylene phosphonic acid), also known as aminotri(methylene phosphonic acid), or the penta sodium salt thereof. The free acid is sold by Monsanto Industrial Chemicals Co. under the tradename, DEQUEST 2000 TM, and the penta sodium salt thereof is called DEQUEST 2006 TM. These DEQUEST compositions are excellent chelators in that they form very stable complexes with transition metal ions that might otherwise react to decompose the hydroperoxide initiators.

It was observed that acrylic adhesives, that is, the compositions containing polymerizable monomers and a peroxide, e.g., cumene hydroperoxide, frequently gel in less than one week at room temperature in the absence of stabilizing additives or polymerization inhibitors.

Screening of selected known free radical inhibitors involved using an accelerated stability test. This test consists of placing a small test tube containing approximately two grams of an oxidant-containing adhesive composition, along with a selected inhibitor, in an oven maintained at 82° C. and observing the time for the fluid mixture to gel or polymerize. Compositions having a stability of one hour or less are regarded as unstable. In general, the greater the stability at 82° C., the longer the shelf life of the adhesive. Stability times of about four hours at 82° C. is considered equivalent to stability at room temperature for one year. Comparisons of time to gel for various compositions containing additives affords a sound basis for evaluating the effectiveness of the additive or stabilizer.

The present invention is further exemplified below by several examples thereof in accordance with the preferred embodiments of the invention. However, it is understood that the invention is not limited to the examples included herein, but that equivalents will be apparent to those skilled in the art. In the following examples, and throughout this application, all parts and percentages are by weight unless otherwise indicated, and all temperatures are reported in degrees Celsius, unless otherwise specified.

EXAMPLES

EXAMPLE 1

Effect of Hydroquinone and its Alkyl Derivatives on Acrylic Monomer Stability

A solution of cumene hydroperoxide in dicyclopentenyloxyethyl methacrylate, a monomer often used in adhesive formulations, was made up to contain 3.3 percent cumeme hydroperoxide by weight. This solution was then divided into portions, and to each portion was added an inhibitor at a molar concentration equivalent to 1000 ppm of hydroquinone. These solutions containing inhibitor were placed in small glass tubes which were placed in an oven maintained at 82°±1° C. The time for the solutions to gel was noted and the results are recorded in Table 1 below.

TABLE 1

| Inhibitor | Hours to Gel |
| --- | --- |
| None | 2 |
| Hydroquinone | 57 |
| t-Butyl hydroquinone | 44 |
| Methyl hydroquinone | 44 |
| Di-t-butyl hydroquinone | 19 |
| Di-t-amyl hydroquinone | 19 |
| Trimethyl hydroquinone | 12 |

It can be seen from the results shown in Table 1 above that hydroquinone and monoalkyl substituted hydroquinones are effective polymerization inhibitors. However, hydroquinone is a particularly preferred inhibitor.

EXAMPLE 2

Effect of Combination of Pentasodium Salt of Nitrilo (Trismethylene Phosphonic Acid) and Hydroquinone on Acrylic Monomer Stability To solutions of dicyclopentenyloxyethyl methacrylate, containing 3.4 percent by weight of cumene hydroperoxide, were added (a) various inhibitors at a concentration of 0.05% by weight and (b) a chelator, the pentasodium salt of nitrilo (trismethylene phosphonic acid) at the level of 465 ppm of solution (0.0465 percent by weight). This latter material (NTMPA) is sold by Monsanto Chemical Co. under the trade name of DEQUEST 2006 TM. The solutions were subjected to stability testing as described in Example 1. The results are shown in Table 2 below.

TABLE 2

| Inhibitor | Time to Gel (hrs.) |
| --- | --- |
| None | 0-1 |
| Hydroquinone (HQ) | 6 |
| Catechol | 3-4 |
| Butylated hydroxytoluene | 1-2 |
| Benzoquinone | 1-2 |
| Monomethyl ether of HQ | 1-2 |
| 1,4-Naphthoquinone | 0-2 |

The advantages of using hydroquinone in combination with NTMPA are clearly demonstrated in Table 2 above.

EXAMPLE 3

Effect of Combination of NTMPA and Hydroquinone on Acrylic Monomer Stability

The monomer solution used for stability testing in this example comprised 94% tetrahydrofurfuryl methacrylate, 2.6% triethyleneglycol dimethacrylate and 3.4% cumene hydroperoxide. To portions of this solution were added 0.1% by weight of various inhibitors, plus 400 ppm NTMPA. Stability testing was conducted as described in Example 1. The results are shown in Table 3 below.

TABLE 3

| Inhibitor | Time (hrs) | % Gel Observed |
| --- | --- | --- |
| None | 1 | 100 |
| Hydroquinone (HQ) | 23 | None |
| Benzoquinone | 6 | 50 |
| t-Butyl catechol | 3 | 100 |
| Methyl ether of HQ | 3 | 25 |
| Catechol | 2 | 25 |

TABLE 3-continued

| Inhibitor | Time (hrs) | % Gel Observed |
| --- | --- | --- |
| 1,4-Naphthoquinone | 2 | 100 |

It is evident that the combination of hydroquinone and NTMPA is superior in imparting stability to acrylic monomers. It should be noted that addition of 475 ppm of ethylene diaminetetraacetic acid, with no inhibitor, gave a solution that completed gelled in one hour. Further, the solution containing benzoquinone was found to cure much more slowly when treated with a reductant than the solution containing hydroquinone.

EXAMPLE 4

Effect of Combination of ATMP and Hydroquinone on Acrylic Monomer Stability

To portions of a solution of triethyleneglycol dimethracrylate containing 3.4% cumene hydroperoxide was added hydroquinone (HQ) and the nitrilo (tris-methylene phosphonic acid) (ATMP) to achieve the additive levels shown in Table 4. Each of these portions was then tested for stability according to the procedure of Example 1. Results are shown below Table 4.

| HQ conc. (ppm) | ATMP conc. (ppm) | Time to Gel (hrs) |
| --- | --- | --- |
| None | None | 1 |
| 75 | 100 | 1 |
| 75 | 300 | 1-2 |
| 225 | 75 | 2-3 |
| 225 | 300 | 5 |

It is evident that at levels of HQ and ATMP both exceeding 220 ppm satisfactory stabilization of certain acrylic monomers containing peroxide can be achieved. ATMP or aminotri (methylene phosphoric acid) is sold by Monsanto Industrial Chemicals Co. as DEQUEST 2000.

EXAMPLE 5

Effect of Combination of NTMPA and Hydroquinone on Acrylic Monomer Stability

To portions of a solution of 3.4% cumene hydroperoxide in dicyclopentenyloxyethyl methacrylate was added various amounts of hydroquinone and NTMPA to achieve the levels, expressed as ppm, shown in Table 5. Each of these portions was then tested for stability according to the procedure of Example 1. Results are given in Table 5.

TABLE 5

| HQ conc. (ppm) | NTMPA conc. (ppm) | Time to Gel (hrs) |
| --- | --- | --- |
| None | None | 1 |
| 118 | 100 | 1-2 |
| 118 | 300 | 1-2 |
| 268 | 75 | 2-3 |
| 268 | 300 | 2-3 |
| 500 | 500 | 15-18 |

It is evident that excellent storage stability can be achieved with peroxide-containing acrylic monomers with both hydroquinone and NTMPA concentrations over 300 ppm.

EXAMPLE 6

Effect of Combination of ATMP and Hydroquinone on Acrylic Monomer Stability

To portions of a solution of tetrahydrofurfuryl methacrylate containing 3.4% cumene hydroperoxide was added HQ and ATMP to achieve the levels shown in Table 6. Each of these portions was tested for stability according to the procedure of Example 1. Results are given in Table 6.

TABLE 6

| HQ conc. (ppm) | ATMP conc. (ppm) | Time to gel (hrs) |
| --- | --- | --- |
| 500 | None | 1 |
| 0 | 500 | 1 |
| 140 | 100 | 1 |
| 140 | 300 | 2-3 |
| 290 | 75 | 2-3 |
| 290 | 300 | 3-4 |
| 1000 | 500 | 23 |

It is evident that levels of HQ and ATMP both of over about 300 ppm are required to adequately stabilize certain acrylic monomers containing peroxide material.

EXAMPLE 7

Effect of Inhibitor on Fixture Time

To solutions of cumeme hydroperoxide, 4% by weight in dicyclopentenyloxyethyl methacrylate were added 0.1% by weight (1000 ppm) of hydroquinone or benzoquinone.

Fixture time was determined by adding one drop of activator solution to one glass slide and one drop of monomer solution to a second glass slide. The slides were placed together at right angles to each other and gently rotated back and forth through approximately a ±45° angle several times, for approximately 6 seconds to ensure good mixing of activator and initiator. A stop watch was started as soon as the two coated surfaces were brought together. The fixture time was recorded as the time when resistance to movement of the mated slides became difficult. In Table 7 the fixture times recorded were the average of three tests.

The activator solution consisted of a 2% by weight solution of acetyl thiourea in triethylene glycol dimethacrylate.

TABLE 7

| Inhibitor | Fixture Time (secs.) |
| --- | --- |
| None | 145 |
| Hydroquinone | 141 |
| Benzoquinone | 400 |

The results demonstrate that hydroquinone is superior to a quinone in terms of fixture time for adhesives.

EXAMPLE 8

Effect of Stabilizers on Adhesive Fixture Time

A two-part adhesive was prepared with the adhesive having the following composition:

| Tetrahydrofurfuryl methacrylate | 66.5 pts. by wt. |
| --- | --- |
| Triethylene glycol dimethacrylate | 8.0 pts. by wt. |
| Thermoplastic polyurethane | 15.0 pts. by wt. |
| Methacrylic acid | 7.5 pts. by wt. |
| Cumene hydroperoxide | 3.0 pts. by wt. |
| Additive | None or 0.03 pts. |

-continued

| | by wt. |

To the above adhesive composition was added either 0.05 percent by weight of hydroquinone (HQ), or aminotris(methylene phosphonic acid) or both. Stability of the various compositions was determined according to the procedure of Example 1. Fixture time was determined according to the procedure in Example 7.

TABLE 8

| HQ | ATMP | Fixture Time (sec) | Time to Gel (hrs) |
|---|---|---|---|
| None | None | 58 | 1 |
| 500 ppm | None | 71 | 2 |
| None | 500 ppm | 74 | 1 |
| 500 ppm | 500 ppm | 84 | 4 |

The results shown in Table 8 demonstrate that stabilization of polymerizable adhesive compositions can be achieved with only a modest and acceptable increase in fixture time.

What is claimed is:

1. An acrylic adhesive composition having improved stability, comprising:
   a free radical polymerizable monomer selected from the group consisting of acrylate and methacrylate esters;
   a free radical initiator; and
   an amount of hydroquinone and
   an amount of an alpha amino phosphonic acid or an alkali metal salt thereof effective to avoid premature gelation.

2. An acrylic adhesive composition having improved stability, comprising:
   a free radical polymerizable monomer selected from the group consisting of acrylate and methacrylate esters;
   a free radical initiator;
   hydroquinone, being present in a range of from about 300 to about 1000 ppm (0.03–0.10% by weight); and
   alpha amino phosphonic acid or an alkali metal salt thereof, being present in a range from about 300 to about 1000 ppm (0.03–0.10 percent by weight).

3. An acrylic adhesive composition, having improved stability, comprising two parts:
   a first part comprising:
   (a) from about 50 to about 97 percent by weight of free radical polymerizable acrylate or methacrylate monomers;
   (b) from about 1 to about 25 percent by weight of an impact-modifying additive selected from the group consisting of elastomers, acrylate oligomers and methacrylate oligomers;
   (c) from about 1 to about 10 percent by weight of a free radical initiator;
   (d) from about 300 to about 1000 ppm (0.03 to 0.10 percent by weight) of hydroquinone; and
   (e) from about 300 to about 1000 ppm (0.03 to 0.10 percent by weight) of alpha amino phosphonic acid, or an alkali metal salt thereof; and
   a second part comprising a suitable accelerator.

4. An acrylic adhesive composition, as described in claims 1 and 2, wherein the alpha amino phosphonic acid is aminotri(methylene phosphonic acid).

5. An acrylic adhesive composition, as described in claims 1 and 2, wherein the alpha amino phosphonic acid is the pentasodium salt of aminotri(trismethylene phosphonic acid).

6. An acrylic adhesive composition, as described in claims 1 and 2, wherein the free radical polymerizable monomers are selected from the group consisting of methacrylic acid, hydroxyethyl methacrylate, hydroxy propyl acrylate, tetrahydrofurfuryl methacrylate and dicyclopentenyloxyethyl methacrylate.

* * * * *